(12) United States Patent
Caillon et al.

(10) Patent No.: US 6,338,918 B1
(45) Date of Patent: Jan. 15, 2002

(54) SPIRAL-WOUND ELECTRODE WITH THREE-DIMENSIONAL SUPPORT

(75) Inventors: Georges Caillon, Bruges; Rémi Najean, Sers; Christian Pineau, Roullet; Christian Dupuy, Fontenille; Jérôme Mazalrey, Varaignes; Jean-Yves Kerybin, Angouleme, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/468,345

(22) Filed: Dec. 21, 1999

(30) Foreign Application Priority Data

Feb. 1, 1999 (FR) ............................................... 9901081

(51) Int. Cl.$^7$ ................................................ H01M 4/75
(52) U.S. Cl. .................. 429/237; 429/233; 429/238; 429/239; 429/241; 429/242; 429/243; 429/244; 429/245; 429/161; 429/164; 429/211
(58) Field of Search ................................ 429/233, 237, 429/238, 239, 241, 242, 243, 244, 245, 164, 211, 161

(56) References Cited

U.S. PATENT DOCUMENTS 5,086,969 A * 2/1992 Guerinault et al. ......... 228/189
5,154,993 A * 10/1992 Beatty ........................ 429/211
5,456,813 A * 10/1995 Grange-Cossou et al. .. 204/284
5,667,915 A * 9/1997 Loustau et al. ............. 429/211

FOREIGN PATENT DOCUMENTS

EP  0 516 535 A1   12/1992
GB  2 055 899 A    3/1981

OTHER PUBLICATIONS

Patent Abstracts of Japan, vol. 006, No. 160 (E–126), Aug. 12, 1982 corresponding to JP 57 080672 A (Yuasa Battery Co Ltd) dated May 20 1982.
Patent Abstracts of Japan, vol. 012, No. 080 (E–590), Mar. 12, 1988 corresponding to JP 62 219462 A (Yuasa Battery Co Ltd) dated Sep. 26, 1987.

* cited by examiner

*Primary Examiner*—Gabrielle Brouillette
*Assistant Examiner*—Angela J. Martin
(74) *Attorney, Agent, or Firm*—Sughrue Mion, PLLC

(57) ABSTRACT

An electrode comprises a porous three-dimensional conductive support and at least one reinforcing metal band fixed along a longitudinal edge portion of the support and having a coefficient of elongation to rupture equal to at least 20% in a direction parallel to the edge portion of the support. Two longitudinal edge portions of the band are bent against the same face of the band, at least part of whose surface is pressed against the support.

16 Claims, 2 Drawing Sheets

SPIRAL-WOUND ELECTRODE WITH THREE-DIMENSIONAL SUPPORT

BACKGROUND OF THE INVENTION

1. Field of the Invention

The present invention relates to an electrode intended to be wound into a spiral, of the paste-coated type whose three-dimensional support is a conductive metal foam, for example. It relates more particularly, although not exclusively, to alkaline electrolyte cylindrical nickel-cadmium (Ni—Cd) or nickel-hydridable metal (Ni—MH) storage cells used for portable applications.

It further encompasses the method of manufacturing the electrode and its use in a storage cell.

2. Description of the Prior Art

A paste-coated electrode comprises a conductive support which can be a two-dimensional or plane support, such as solid or perforated strip, expanded metal, mesh or woven fabric, or a three-dimensional support such as foam or felt. The support is coated with a layer of paste containing the electrochemically active material and usually a binder.

When the storage cell is assembled, the electrode must be electrically connected to the current output terminal, generally by means of a connection fixed to the inside part of the terminal and to the conductive support of the electrode. The connection is preferably welded to the support to produce a reliable electrical contact.

In the case of cells with a spiral-wound electrode assembly it is advantageous to be able to weld the connection directly to the edge of the electrode. When the electrode support is a three-dimensional porous support with a large volume, its edge does not have the solidity needed for a connection to be welded directly to it. A number of documents therefore propose to reinforce the edge portion of the support before fixing the connection to it.

The support can be reinforced by fixing a reinforcing band in the form of a metal tape along the longitudinal edge portion.

Japanese patent application JP-62 219 462 describes a fibrous support electrode whose edge portion is reinforced by a metal band bent into a U-shape straddling and spot-welded to the support. A connecting tongue is then fixed to the band.

The use of a reinforcing band with a cut-out edge portion has been suggested. The band is compressed onto the support so that the cut-outs are inserted into the pores of the support to anchor the band to the support.

Japanese patent application JP-62 237 665 proposes to use a metal plate bent into a U-shape with a crenellated edge. The plate is compressed onto the felt support so that the upstanding portions are anchored to the support.

British patent GB-2 055 899 describes a porous support electrode. The reinforcement is a conductive plate whose edge is cut to a sawtooth shape and bent at right angles to the plate. Pressure is applied to the teeth so that they penetrate into the support. A metal deposit then consolidates the assembly.

A reinforcing band of this kind is costly to make and difficult to fit in a reliable and reproducible manner.

Another solution is to use a reinforcing band consisting of a very porous material, which can be the same as the material of the support. The reinforcing band is compressed onto the support so that the two materials interpenetrate.

European patent EP-0 658 946 describes a plane electrode whose edge portion is reinforced by compressing a plurality of layers of foam similar to that constituting the support.

According to Japanese patent application JP-57 080 672 the edge portion of a felt support is bent on itself one or more times and compressed.

All the reinforcing methods previously described stiffen the longitudinal edge portion of the electrode, making the flexing imposed by subsequently winding the electrode into a spiral very difficult.

European patent application EP-0 516 535 proposes to provide on each side of the edge portion of the electrode an expanded metal or perforated strip connection with a voids ratio exceeding 40% and fixed by compression.

This solution is difficult to use because of the high risk of short circuits. The short circuits are caused by the free metal strands at the edge of the connection, which can perforate the separator and come into contact with the opposite polarity electrode.

The object of the present invention is to propose a spiral-wound electrode with a three-dimensional support having a longitudinal edge portion which is reinforced in order to receive a connection welded to its edge, which is easier to wind into a spiral and for which there is a lower risk of short circuits than for prior art electrodes.

SUMMARY OF THE INVENTION

The invention consists in an electrode comprising a porous three-dimensional conductive support and at least one reinforcing metal band fixed along a longitudinal edge portion of the support and having a coefficient of elongation to rupture equal to at least 20% in a direction parallel to the edge portion of the support, wherein two longitudinal edge portions of the band are bent against the same face of the band, at least part of whose surface is pressed against the support.

This prevents short circuits associated with the presence of metal strands escaping from the edge portion of the band by enclosing those strands between the band and the electrode support.

To preserve the longitudinal flexibility which is indispensable for winding the electrode into a spiral, the reinforcing band must itself be highly flexible, which is possible only if the band is capable of sufficient elongation without deformation. This property is assessed by the coefficient of elongation to rupture, defined as the difference between the length at rupture and the initial length divided by the initial length of the sample, which is measured in the following manner.

A sample of the material to be characterized is inserted between the jaws of a tensile test machine. The length $L_0$ between the jaws is 100 mm and the width of the sample is that of the band that will be used to reinforce the edge portion of the electrode. The strain is applied at a rate of 100 mm/min. The length at rupture Lr is determined from the response curve of the traction force as a function of elongation.

The coefficient of elongation to rupture y expressed as a percentage is calculated from the equation:

$$\gamma = 100\,(L_r - L_0)/L_0$$

The band is preferably expanded metal, mesh or perforated strip with a voids ratio of at least 40%, and preferably at least 50%. The voids ratio is defined as the ratio of the surface area of the voids to the total surface area of the band.

The band can be bent into a U-shape in its lengthwise direction so that it can straddle the edge portion of the electrode, its bent edge portions being trapped inside the U-shape. Two bands with both edge portions bent in this way can be provided on respective opposite sides of the support.

The band is preferably provided on only one side of the support, advantageously the side of the support which is on the outside during winding into a spiral. The band is then subjected to traction and stretches without deforming. If it were instead placed on the inside of the spool, it could become deformed and this deformation could cause increases in thickness compromising the spiral winding.

The support is usually a nickel foam. The band can be made of nickel, nickel-plated steel or stainless steel.

The band is advantageously welded to the support. The fixing of the band to the support is then more solid and the electrical continuity is reliable. The welding process can be a spot welding, knurled wheel welding with contiguous spots or ultrasound welding.

The invention also consists in a storage cell comprising a spiral-wound electrode of the above kind forming a spool and electrically connected to a terminal by a connection member welded to the edge of the spool and to the terminal.

The material of the connection member can be nickel, nickel-plated steel or stainless steel. The band is preferably made of the same metal as the connection member to facilitate welding.

In a first embodiment of the invention the electrode contains electrochemically active material in the form of nickel-based hydroxide.

In a second embodiment, the electrode contains a cadmium-based electrochemically active material.

In a third embodiment of the invention, the electrode contains electrochemically active material in the form of a metal alloy capable of absorbing hydrogen to form a hydride.

In a fourth embodiment of the invention the electrode contains electrochemically active material in the form of a carbon-containing material into whose structure lithium can be inserted, for example graphite, coke, carbon black and vitreous carbon.

In a fifth embodiment of the invention the electrode contains electrochemically active material in the form of an oxide of a transition metal, such as vanadium oxide, lithium-containing oxides of manganese, nickel and cobalt and lithium-containing oxides containing nickel, cobalt, manganese or aluminum, for example.

The invention will be better understood and other advantages and features of the invention will become apparent on reading the following description which is given by way of non-limiting example and with reference to the accompanying drawings.

DETAILED DESCRIPTION OF THE PREFERRED EMBODIMENTS

It is to be clearly understood that the drawings and the corresponding parts of the description are given entirely by way of illustration of the subject matter of the invention, of which they do not in any way constitute a limitation.

EXAMPLE 1

Figure 1:
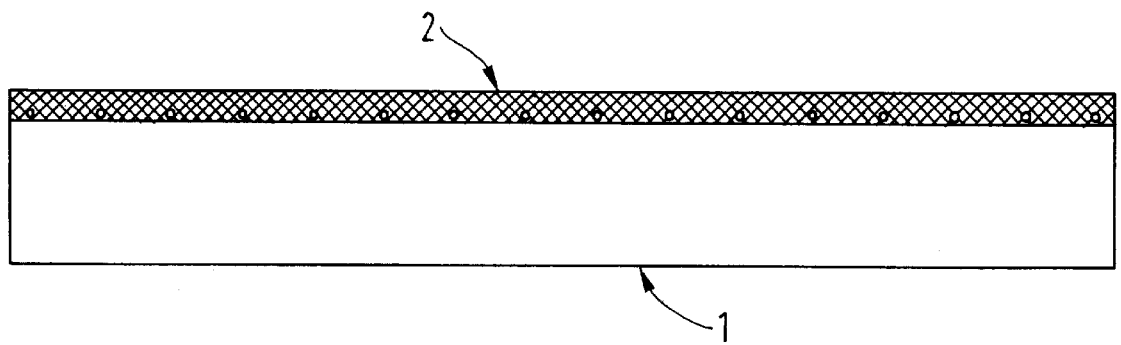
FIG. 1 is a front view of a first embodiment of an electrode in accordance with the present invention.
Figure 2:
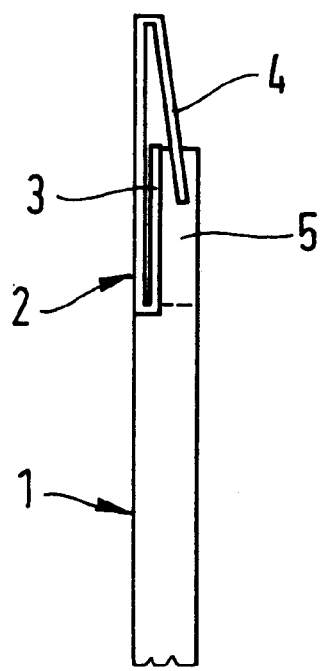
FIG. 2 is a side view of a first embodiment of the electrode in accordance with the invention.

An electrode 1 in accordance with the invention shown in FIGS. 1 and 2 was manufactured with a current collector support in the form of a nickel foam band approximately 250 mm long and 32 mm wide. A paste containing a binder and the electrochemically active material, which was in the form of a nickel-based hydroxide, was introduced into the pores of the foam.

A band 2 of stainless steel mesh approximately 6 mm wide and the same length as the electrode 1 was cut so that its longitudinal axis was parallel to the diagonals of the mesh. The longitudinal edge portions 3 and 4 were bent against the same face of the mesh 2, partially overlapping to form a narrower band whose edge portions did not have any free strands.

The active material was removed from one longitudinal edge portion 5 of the electrode 1 to a distance of approximately 1 mm to 2 mm by blowing with compressed air and ultrasound treatment. The mesh 2 was applied to the edge portion 5 so that the bent edge portions 3, 4 of the mesh 2 were placed against the electrode 1. This trapped the free strands of the mesh against the foam.

The mesh 2 was fixed to the electrode 1 by electric spot welding with the spots 1 cm apart. The electrode 1 was then compressed to its final thickness.

Figure 3:
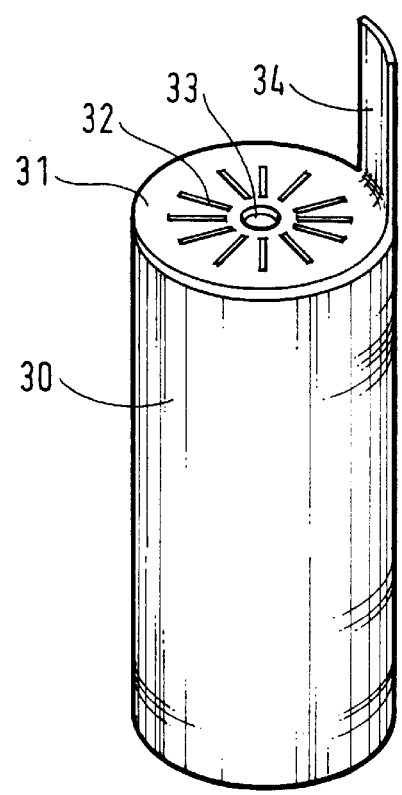
FIG. 3 is a diagrammatic view of a spool and a connection member.

The positive electrode 1 formed as above, a polyamide separator and a negative electrode with a cadmium-based electrochemically active material were then superposed to form a stack which was wound into a spiral to form a spool 30 as shown in FIG. 3, taking care to place the side of the electrode carrying the band toward the outside of the spool 30.

A connection member 31 in the form of a nickel-plated steel disc incorporating openings 32 flanked by two lips which came into contact with the spool was then welded to the mesh 2 reinforcing the edge of the spiral-wound positive electrode 1.

After placing it in a container, the spool was impregnated with electrolyte using in particular the central orifice 33 in the piece 31. The alkaline electrolyte was a mixture of potassium hydroxide (KOH), sodium hydroxide (NaOH) and lithium hydroxide (LiOH) in aqueous solution.

The connection member 31 carried a lug 34 whose opposite end was fixed to the inside part of a current output terminal after adding the electrolyte. The cell 5 was closed by crimping a lid to the container.

EXAMPLE 2

Figure 4:
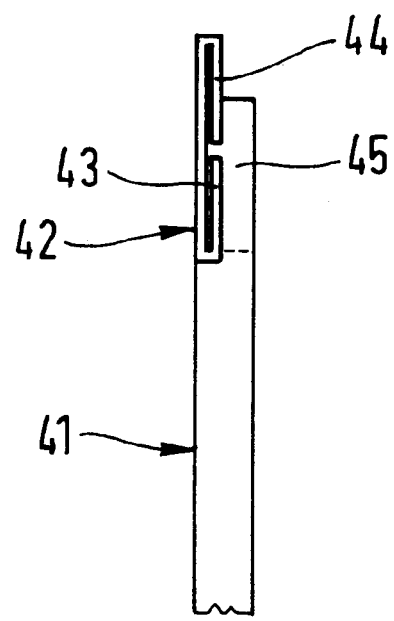
FIG. 4 shows a second embodiment of the invention.

An electrode 41 in accordance with the invention shown in FIG. 4 was manufactured using a current collector support and an active layer analogous to those of example 1.

An expanded nickel-plated steel band 42 approximately 4 mm wide and the same length as the electrode 41 was prepared. The longitudinal edge portions 43 and 44 were bent onto the same face of the expanded metal 42. The bent portion of each edge portion 43, 44 had a width at most equal to half that of the band 42 so that the edge portions 43, 44 did not overlap. A narrower band whose edges did not have any free strands was obtained in this way.

As in example 1, the active layer was removed from one longitudinal edge portion 45 of the electrode 41 and the expanded metal 42 was applied along the edge portion 45 so that the bent edge portions 43, 44 of the expanded metal 42 were placed against the electrode 41. The free strands of the deployed metal were trapped against the foam in this way.

The expanded metal 42 was fixed to the electrode 41 by knurled wheel welding with contiguous spots. The electrode 41 was then compressed to its final thickness.

The positive electrode 41 formed as above, a polyolefin separator and a negative electrode whose electrochemically active material was a metal alloy capable of absorbing hydrogen were then superposed to form a stack which was then spiral-wound to form a spool.

A nickel-plated steel connection member analogous to that of FIG. 3 was welded to the expanded metal 42 reinforcing the edge of the spiral-wound positive electrode 41 and carried a lug whose opposite end was fixed to the inside part of a current output terminal.

After inserting it into a container, the spool was impregnated with an alkaline electrode analogous to that of example 1. The cell was closed by crimping a lid to the container.

EXAMPLE 3

Figure 5:
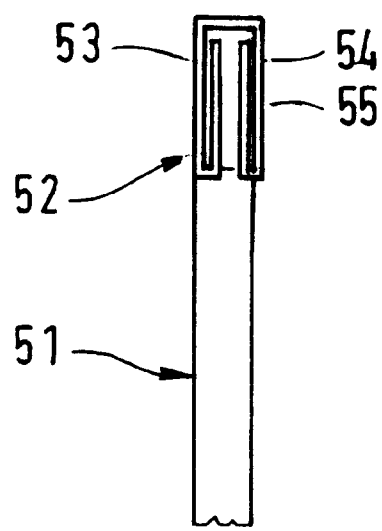
FIG. 5 shows a third embodiment of the invention.

An electrode 51 in accordance with the invention as shown in FIG. 5 was manufactured. A band 52 of a mesh analogous to that of example 1 was prepared. The longitudinal edge portions 53 and 54 were bent against the same face of the mesh 52 so that the edge portions 53, 54 did not touch. The band 52 was then bent in two to form a U-shape along a longitudinal axis. The bent band 52 then straddled the edge portion 55 of the electrode from which the active layer had previously been removed. The band 52 was finally welded to the edge portion 55.

What is claimed is:

1. An electrode comprising:
   a porous three-dimensional conductive support; and
   at least one reinforcing metal band fixed along a longitudinal edge portion o said support wherein at least one longitudinal end portion of said band is bent towards a major face of said band to form a folded end portion, and wherein said folded end portion is disposed only on one side of said support.

2. The electrode claimed in claim 1 wherein said band is made of expanded metal, mesh or perforated strip having a voids ratio equal to at least 40%.

3. The electrode claimed in claim 1 wherein said band is disposed on one side only of said support.

4. The electrode claimed in claim 3 wherein said band is disposed on a side of said support which is on the outside during winding into a spiral.

5. The electrode claimed in claim 1 wherein said band is welded to said support.

6. A storage cell comprising an electrode as claim 1 which is spiral-wound to form a spool and is electrically connected to a terminal by a connection member welded to an edge of said spool and to said terminal.

7. The storage cell claimed in claim 6 wherein said band and said connection member are made of the same metal.

8. The storage cell claimed in claim 6 wherein said electrode contains electrochemically active material in the form of nickel-based hydroxide.

9. The electrode claimed in claim 1, wherein said band has a coefficient of elongation to rupture equal to at least 20% in a direction parallel to said edge portion of said support.

10. An electrode comprising:
    a porous three-dimensional conductive support; and
    at least one reinforcing metal band fixed along a longitudinal edge portion of said support wherein two longitudinal end portions of said band are bent towards a major face of said band to respectively form a first folded portion and a second folded portion, and wherein at least said first folded portion is disposed on a first side of said support.

11. The electrode claimed in claim 10, wherein said second folded portion is disposed on a second side of said support, opposite said first side.

12. The electrode claimed in claim 10, wherein said first folded portion has an end portion and said second folded portion has an end portion, and wherein said end portion of said second folded portion overlaps said first folded portion.

13. The electrode claimed in claim 10, wherein said first folded portion has an end portion and said second folded portion has an end portion, and wherein said respective end portions of said first and second folded portions do not overlap each other.

14. The electrode claimed in claim 12, wherein said end portion of said first folded portion is trapped against said support, and wherein said end portion of said second folded portion is trapped against said support.

15. The electrode claimed in claim 13, wherein said end portion of said first folded portion is trapped against said support, and wherein said end portion of said second folded portion is trapped against said support.

16. The electrode claimed in claim 11, wherein said first folded portion has an end portion and said second folded portion has an end portion, and wherein said respective end portions are trapped against said support.

* * * * *